United States Patent
Cao et al.

(10) Patent No.: US 11,906,676 B2
(45) Date of Patent: Feb. 20, 2024

(54) RADIATION DETECTORS WITH SCINTILLATORS

(71) Applicant: SHENZHEN XPECTVISION TECHNOLOGY CO., LTD., Shenzhen (CN)

(72) Inventors: Peiyan Cao, Shenzhen (CN); Yurun Liu, Shenzhen (CN)

(73) Assignee: SHENZHEN XPECTVISION TECHNOLOGY CO., LTD., Shenzhen (CN)

( * ) Notice: Subject to any disclaimer, the term of this patent is extended or adjusted under 35 U.S.C. 154(b) by 225 days.

(21) Appl. No.: 17/471,715

(22) Filed: Sep. 10, 2021

(65) Prior Publication Data
US 2021/0405218 A1    Dec. 30, 2021

Related U.S. Application Data

(63) Continuation of application No. PCT/CN2019/080404, filed on Mar. 29, 2019.

(51) Int. Cl.
*G01T 1/20* (2006.01)

(52) U.S. Cl.
CPC .......... *G01T 1/2018* (2013.01); *G01T 1/2002* (2013.01)

(58) Field of Classification Search
None
See application file for complete search history.

(56) References Cited

U.S. PATENT DOCUMENTS

| | | | |
|---|---|---|---|
| 2002/0063218 A1 | 5/2002 | Maydanich et al. | |
| 2011/0017916 A1 | 1/2011 | Schulz et al. | |
| 2014/0175296 A1 | 6/2014 | Benlloch Baviera et al. | |
| 2015/0338529 A1* | 11/2015 | Svenonius | G01T 1/2002 264/135 |
| 2018/0136344 A1 | 5/2018 | Nelson et al. | |

FOREIGN PATENT DOCUMENTS

| | | |
|---|---|---|
| CN | 101849198 A | 9/2010 |
| CN | 101893718 A | 11/2010 |
| CN | 101978289 A | 2/2011 |
| CN | 102066976 A | 5/2011 |
| CN | 106461797 A | 2/2017 |
| CN | 107438900 A | 12/2017 |
| JP | 2012002627 A | 1/2012 |
| KR | 20090098327 A | 9/2009 |
| WO | 2009060349 A3 | 9/2009 |

* cited by examiner

*Primary Examiner* — Edwin C Gunberg
(74) *Attorney, Agent, or Firm* — IPRO, PLLC; Qian Gu

(57) ABSTRACT

Disclosed herein is a radiation detector, comprising a first pixel; a first reflector; and a first scintillator, wherein the first reflector is configured to guide essentially all photons emitted by the first scintillator into the first pixel. The first reflector is configured to reflect photons emitted by the first scintillator toward the first reflector. The first scintillator is essentially completely enclosed by the first reflector and the first pixel.

17 Claims, 15 Drawing Sheets

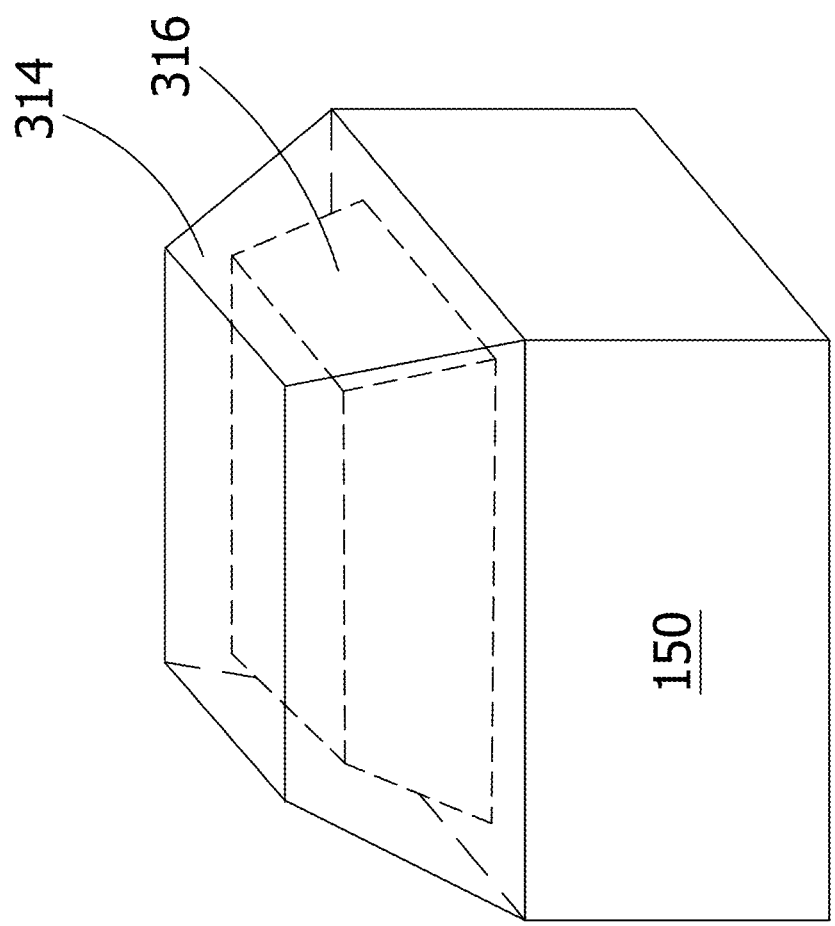

RADIATION DETECTORS WITH SCINTILLATORS

TECHNICAL FIELD

The disclosure herein relates to radiation detectors.

BACKGROUND

A radiation detector is a device that measures a property of a radiation. Examples of the property may include a spatial distribution of the intensity, phase, and polarization of the radiation. The radiation may be one that has interacted with an object. For example, the radiation measured by the radiation detector may be a radiation that has penetrated the object. The radiation may be an electromagnetic radiation such as infrared light, visible light, ultraviolet light, X-ray or γ-ray. The radiation may be of other types such as α-rays and β-rays. The radiation may comprise radiation particles such as photons (electromagnetic waves) and subatomic particles.

SUMMARY

Disclosed herein is radiation detector, comprising a first pixel; a first reflector; and a first scintillator, wherein the first reflector is configured to guide essentially all photons emitted by the first scintillator into the first pixel.

According to an embodiment, the first reflector is in direct physical contact with the first scintillator.

According to an embodiment, the first scintillator is in direct physical contact with the first pixel.

According to an embodiment, the radiation detector further comprises a second pixel adjacent to the first pixel; a second reflector; and a second scintillator, wherein the second reflector is configured to guide essentially all photons emitted by the second scintillator into the second pixel.

According to an embodiment, the first reflector is in direct physical contact with the second reflector.

According to an embodiment, the radiation detector further comprises a third pixel adjacent to the first pixel; a third reflector; and a third scintillator, wherein the third reflector is configured to guide essentially all photons emitted by the third scintillator into the third pixel.

According to an embodiment, the first reflector is configured to reflect photons emitted by the first scintillator toward the first reflector.

According to an embodiment, the first reflector is not opaque to radiation particles which are able to cause the first scintillator to emit photons when the radiation particles are incident on the first scintillator.

According to an embodiment, the first scintillator is essentially completely enclosed by the first reflector and the first pixel.

According to an embodiment, the radiation detector further comprises a fourth reflector; and a fourth scintillator, wherein the fourth reflector is configured to guide essentially all photons emitted by the fourth scintillator into the first pixel.

According to an embodiment, the first reflector comprises a material selected from the group consisting of aluminum, silver, gold, copper, and any combinations thereof.

According to an embodiment, the first scintillator comprises sodium iodide.

According to an embodiment, the first scintillator comprises quantum dots.

According to an embodiment, the radiation detector further comprises a first substrate, wherein the first scintillator is in a recess into a surface of the first substrate.

According to an embodiment, a portion of the first reflector is disposed on sidewalls of the recess.

According to an embodiment, a portion of the first reflector is disposed on an end wall of the recess.

According to an embodiment, the recess has a shape of a truncated pyramid.

According to an embodiment, the first substrate comprises silicon or silicon dioxide.

According to an embodiment, the radiation detector further comprises a second substrate, wherein the first pixel is in the second substrate.

According to an embodiment, the radiation detector further comprises a seal layer disposed between the first substrate and the second substrate, wherein the seal layer is not opaque to photons emitted by the first scintillator.

Disclosed herein is a method of operating a radiation detector, comprising exposing a first scintillator of the radiation detector to first radiation particles, thereby causing emission of first photons from the first scintillator; and guiding essentially all photons emitted by the first scintillator into a first pixel of the radiation detector using a first reflector of the radiation detector.

According to an embodiment, the first reflector is in direct physical contact with the first scintillator.

According to an embodiment, the first scintillator is in direct physical contact with the first pixel.

According to an embodiment, the method further comprises determining a characteristic of the first radiation particles based on the first photons.

According to an embodiment, the characteristic is energies of the first radiation particles or radiant flux of the first radiation particles.

According to an embodiment, the method further comprises exposing a second scintillator of the radiation detector to second radiation particles, thereby causing emission of second photons from the second scintillator; and guiding essentially all photons emitted by the second scintillator into a second pixel of the radiation detector using a second reflector of the radiation detector, wherein the second pixel is adjacent to the first pixel.

According to an embodiment, the first reflector is in direct physical contact with the second reflector.

According to an embodiment, the method further comprises exposing a third scintillator of the radiation detector to third radiation particles, thereby causing emission of third photons from the third scintillator; and guiding essentially all photons emitted by the third scintillator into a third pixel of the radiation detector using a third reflector of the radiation detector, wherein the third pixel is adjacent to the first pixel.

According to an embodiment, said guiding comprises reflecting photons emitted by the first scintillator toward the first reflector using the first reflector.

According to an embodiment, the first reflector is not opaque to the first radiation particles.

According to an embodiment, the first scintillator is essentially completely enclosed by the first reflector and the first pixel.

According to an embodiment, the method further comprises exposing a fourth scintillator of the radiation detector to fourth radiation particles, thereby causing emission of fourth photons from the fourth scintillator; and guiding essentially all photons emitted by the fourth scintillator into the first pixel using a fourth reflector of the radiation detector.

According to an embodiment, the first reflector comprises a material selected from the group consisting of aluminum, silver, gold, copper, and any combinations thereof.

According to an embodiment, the first scintillator comprises quantum dots.

According to an embodiment, the radiation detector comprises a first substrate, and the first scintillator is in a recess into a surface of the first substrate.

According to an embodiment, a portion of the first reflector is disposed on sidewalls of the recess.

According to an embodiment, a portion of the first reflector is disposed on an end wall of the recess.

According to an embodiment, the recess has a shape of a truncated pyramid.

According to an embodiment, the first substrate comprises silicon or silicon dioxide.

According to an embodiment, the radiation detector further comprises a second substrate, and the first pixel is in the second substrate.

According to an embodiment, the radiation detector further comprises a seal layer disposed between the first substrate and the second substrate, and the seal layer is not opaque to photons emitted by the first scintillator.

Disclosed herein is a method, comprising forming a first recess into a surface of a first substrate; forming a first reflector on walls of the first recess; forming a first scintillator in the first recess; and bonding a second substrate having a pixel to the first substrate, wherein the first reflector is configured to guide essentially all photons emitted by the first scintillator into the pixel.

According to an embodiment, the first reflector is in direct physical contact with the first scintillator.

According to an embodiment, the first scintillator is in direct physical contact with the pixel.

According to an embodiment, the first reflector is configured to reflect photons emitted by the first scintillator toward the first reflector.

According to an embodiment, the first scintillator is essentially completely enclosed by the first reflector and the pixel.

According to an embodiment, the method further comprises forming a second recess into the surface of the first substrate; forming a second reflector on walls of the second recess; and forming a second scintillator in the second recess; wherein the second reflector is configured to guide essentially all photons emitted by the second scintillator into the pixel.

BRIEF DESCRIPTION OF FIGURES

FIG. 3B schematically shows a perspective view of a portion of the radiation detector of FIG. 3A, according to an embodiment.

DETAILED DESCRIPTION

Figure 1:
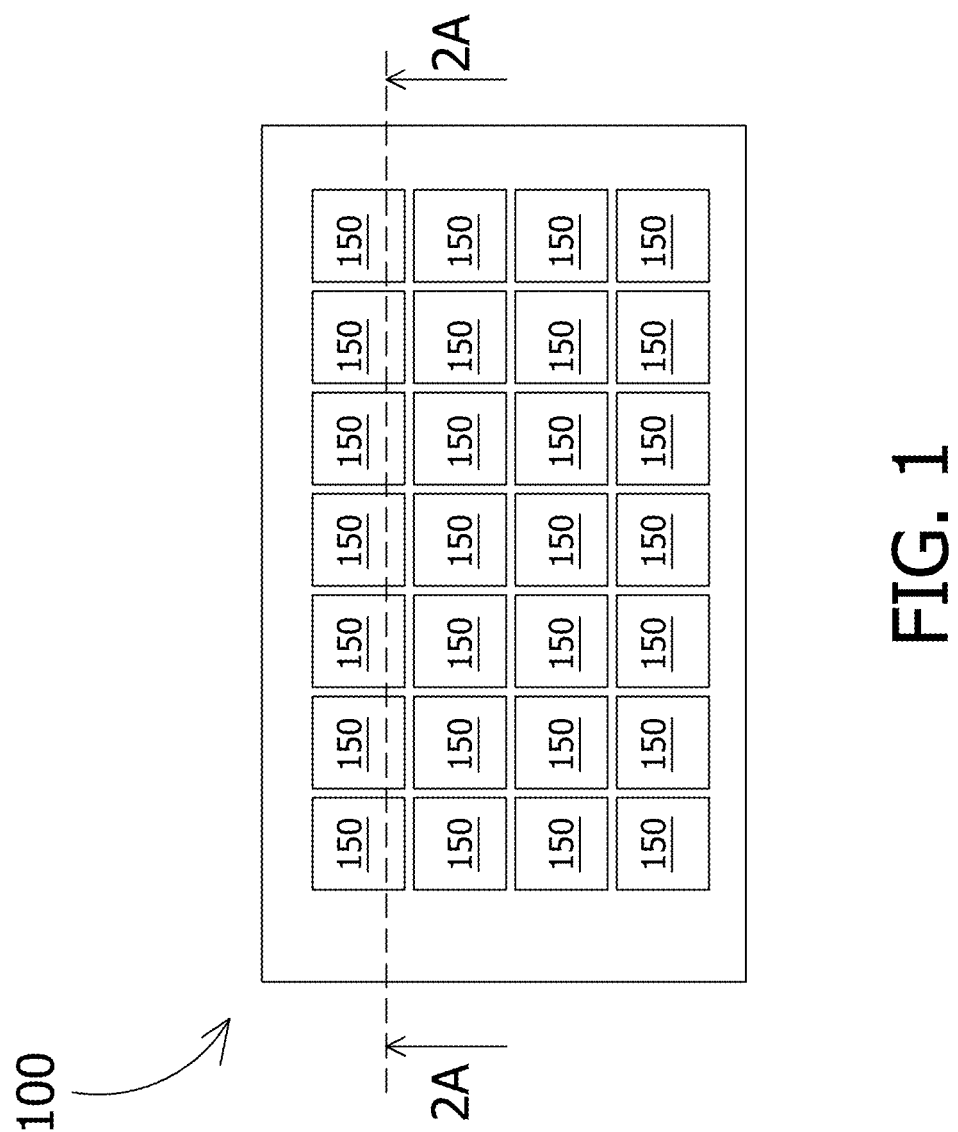
FIG. 1 schematically shows an image sensor, according to an embodiment.

FIG. 1 schematically shows an image sensor 100, as an example. The image sensor 100 includes an array of pixels 150. The array may be a rectangular array (as shown in FIG. 1), a honeycomb array, a hexagonal array or any other suitable array. The array of pixels 150 in the example of FIG. 1 has 4 rows and 7 columns; however, in general, the array of pixels 150 may have any number of rows and any number of columns.

Each pixel 150 is configured to detect radiation from a radiation source incident thereon and may be configured to measure a characteristic (e.g., the energy of the particles, the wavelength, the radiant flux, and the frequency) of the radiation. For example, each pixel 150 may be configured to count numbers of particles of radiation incident thereon whose energy falls in a plurality of bins of energy, within a period of time. All the pixels 150 may be configured to count the numbers of particles of radiation incident thereon within a plurality of bins of energy within the same period of time. When the incident particles of radiation have similar energy, the pixels 150 may be simply configured to count numbers of particles of radiation incident thereon within a period of time, without measuring the energy of the individual particles.

Each pixel 150 may have its own analog-to-digital converter (ADC) configured to digitize an analog signal representing the energy of an incident particle of radiation into a digital signal, or to digitize an analog signal representing the total energy of a plurality of incident particles of radiation into a digital signal. The pixels 150 may be configured to operate in parallel. For example, when one pixel 150 measures an incident particle of radiation, another pixel 150 may be waiting for a particle of radiation to arrive. The pixels 150 may not have to be individually addressable.

The image sensor 100 described here may have applications such as in an X-ray telescope, X-ray mammography, industrial X-ray defect detection, X-ray microscopy or microradiography, X-ray casting inspection, X-ray non-destructive testing, X-ray weld inspection, X-ray digital subtraction angiography, etc. It may be suitable to use this image sensor 100 in place of a photographic plate, a photographic film, a PSP plate, an X-ray image intensifier, a scintillator, or another semiconductor X-ray detector. The image sensor 100 may also be used as an image sensor that detects visible light photons containing the image of an object.

Figure 2A:
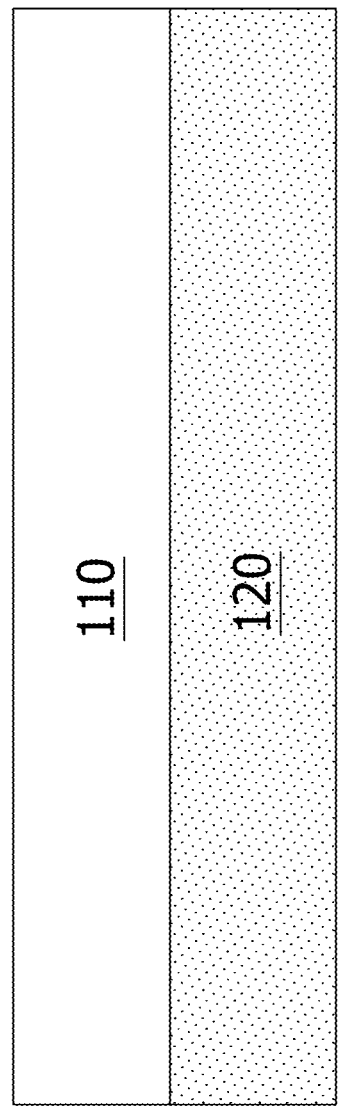
FIG. 2A schematically shows a simplified cross-sectional view of the image sensor.

FIG. 2A schematically shows a simplified cross-sectional view of the image sensor 100 of FIG. 1 along a line 2A-2A, according to an embodiment. More specifically, the image sensor 100 may include a radiation absorption layer 110 and an electronics layer 120 (e.g., an ASIC) for processing or analyzing electrical signals which incident radiation generates in the radiation absorption layer 110. The image sensor 100 may or may not include a scintillator (not shown). The radiation absorption layer 110 may include a semiconductor material such as, silicon, germanium, GaAs, CdTe, CdZnTe, or a combination thereof. The semiconductor material may have a high mass attenuation coefficient for the radiation of interest.

Figure 2B:
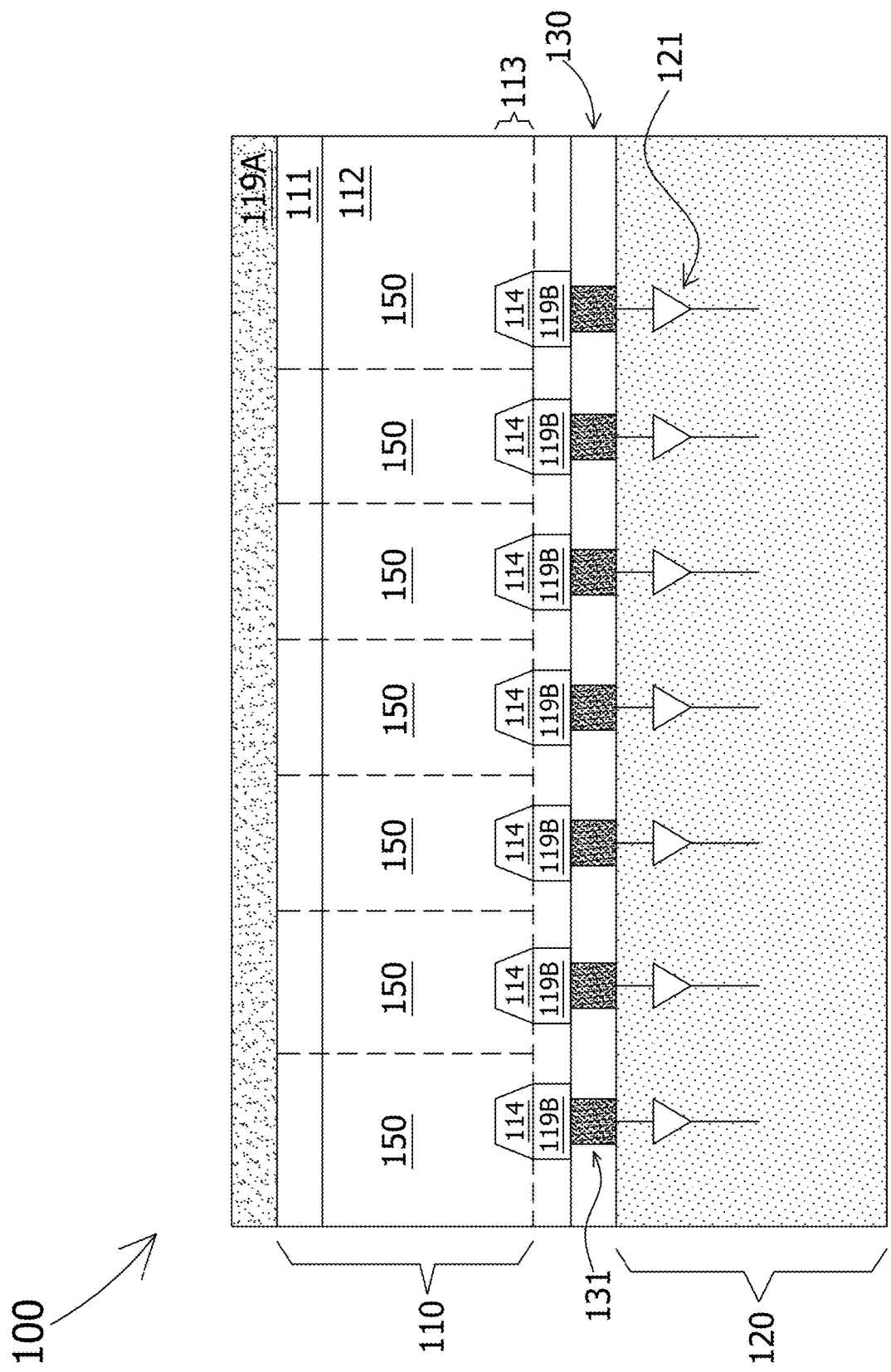
FIG. 2B schematically shows a detailed cross-sectional view of the image sensor.

FIG. 2B schematically shows a detailed cross-sectional view of the image sensor 100 of FIG. 1 along the line 2A-2A, as an example. More specifically, the radiation absorption layer 110 may include one or more diodes (e.g., p-i-n or p-n) formed by a first doped region 111, one or more discrete regions 114 of a second doped region 113. The second doped region 113 may be separated from the first doped region 111 by an optional intrinsic region 112. The discrete regions 114 are separated from one another by the first doped region 111 or the intrinsic region 112. The first doped region 111 and the second doped region 113 have opposite types of doping (e.g., region 111 is p-type and region 113 is n-type, or region 111 is n-type and region 113 is p-type). In the example of FIG. 2B, each of the discrete regions 114 of the second doped region 113 forms a diode with the first doped region 111 and the optional intrinsic region 112. Namely, in the example in FIG. 2B, the radiation absorption layer 110 has a plurality of diodes (more specifically, 7 diodes corresponding to 7 pixels 150 of one row in the array of FIG. 1). The plurality of diodes have an electrical contact 119A as a shared (common) electrode which may comprise polysilicon. The first doped region 111 may also have discrete portions.

The electronics layer 120 may include an electronic system 121 suitable for processing or interpreting signals generated by the radiation incident on the radiation absorption layer 110. The electronic system 121 may include an analog circuitry such as a filter network, amplifiers, integrators, and comparators, or a digital circuitry such as a microprocessor, and memory. The electronic system 121 may include one or more ADCs. The electronic system 121 may include components shared by the pixels 150 or components dedicated to a single pixel 150. For example, the electronic system 121 may include an amplifier dedicated to each pixel 150 and a microprocessor shared among all the pixels 150. The electronic system 121 may be electrically connected to the pixels 150 by vias 131. Space among the vias may be filled with a filler material 130, which may increase the mechanical stability of the connection of the electronics layer 120 to the radiation absorption layer 110. Other bonding techniques are possible to connect the electronic system 121 to the pixels 150 without using the vias 131.

When radiation from the radiation source (not shown) hits the radiation absorption layer 110 including diodes, the particles of radiation may be absorbed and generate one or more charge carriers (e.g., electrons, holes) by a number of mechanisms. The charge carriers may drift to the electrodes of one of the diodes under an electric field. The field may be an external electric field. The electrical contact 119B may include discrete portions each of which is in electrical contact with the discrete regions 114. The term "electrical contact" may be used interchangeably with the word "electrode." In an embodiment, the charge carriers may drift in directions such that the charge carriers generated by a single particle of the radiation are not substantially shared by two different discrete regions 114 ("not substantially shared" here means less than 2%, less than 0.5%, less than 0.1%, or less than 0.01% of these charge carriers flow to a different one of the discrete regions 114 than the rest of the charge carriers). Charge carriers generated by a particle of the radiation incident around the footprint of one of these discrete regions 114 are not substantially shared with another of these discrete regions 114. A pixel 150 associated with a discrete region 114 may be an area around the discrete region 114 in which substantially all (more than 98%, more than 99.5%, more than 99.9%, or more than 99.99% of) charge carriers generated by a particle of the radiation incident therein flow to the discrete region 114. Namely, less than 2%, less than 1%, less than 0.1%, or less than 0.01% of these charge carriers flow beyond the pixel 150.

Figure 2C:
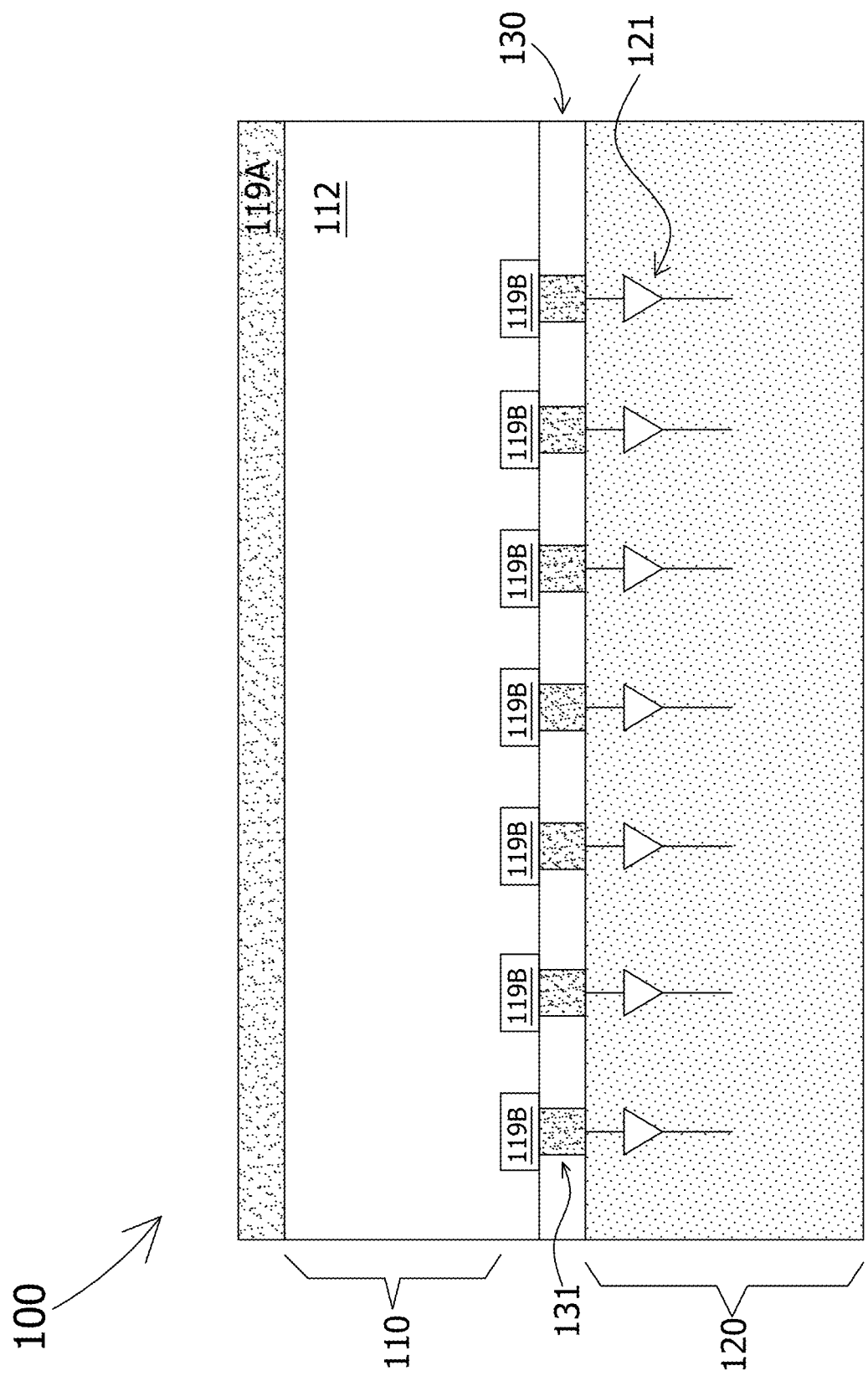
FIG. 2C schematically shows an alternative detailed cross-sectional view of the image sensor.

FIG. 2C schematically shows an alternative detailed cross-sectional view of the image sensor 100 of FIG. 1 along the line 2A-2A, according to an embodiment. More specifically, the radiation absorption layer 110 may include a resistor of a semiconductor material such as, silicon, germanium, GaAs, CdTe, CdZnTe, or a combination thereof, but does not include a diode. The semiconductor material may have a high mass attenuation coefficient for the radiation of interest. In an embodiment, the electronics layer 120 of FIG. 2C is similar to the electronics layer 120 of FIG. 2B in terms of structure and function.

When the radiation hits the radiation absorption layer 110 including the resistor but not diodes, it may be absorbed and generate one or more charge carriers by a number of mechanisms. A particle of the radiation may generate 10 to 100,000 charge carriers. The charge carriers may drift to the electrical contacts 119A and 119B under an electric field. The electric field may be an external electric field. The electrical contact 119B includes discrete portions. In an embodiment, the charge carriers may drift in directions such that the charge carriers generated by a single particle of the radiation are not substantially shared by two different discrete portions of the electrical contact 119B ("not substantially shared" here means less than 2%, less than 0.5%, less than 0.1%, or less than 0.01% of these charge carriers flow to a different one of the discrete portions than the rest of the charge carriers). Charge carriers generated by a particle of the radiation incident around the footprint of one of these discrete portions of the electrical contact 119B are not substantially shared with another of these discrete portions of the electrical contact 119B. A pixel 150 associated with a discrete portion of the electrical contact 119B may be an area around the discrete portion in which substantially all (more than 98%, more than 99.5%, more than 99.9% or more than 99.99% of) charge carriers generated by a particle of the radiation incident therein flow to the discrete portion of the electrical contact 119B. Namely, less than 2%, less than 0.5%, less than 0.1%, or less than 0.01% of these charge carriers flow beyond the pixel associated with the one discrete portion of the electrical contact 119B.

Figure 3A:
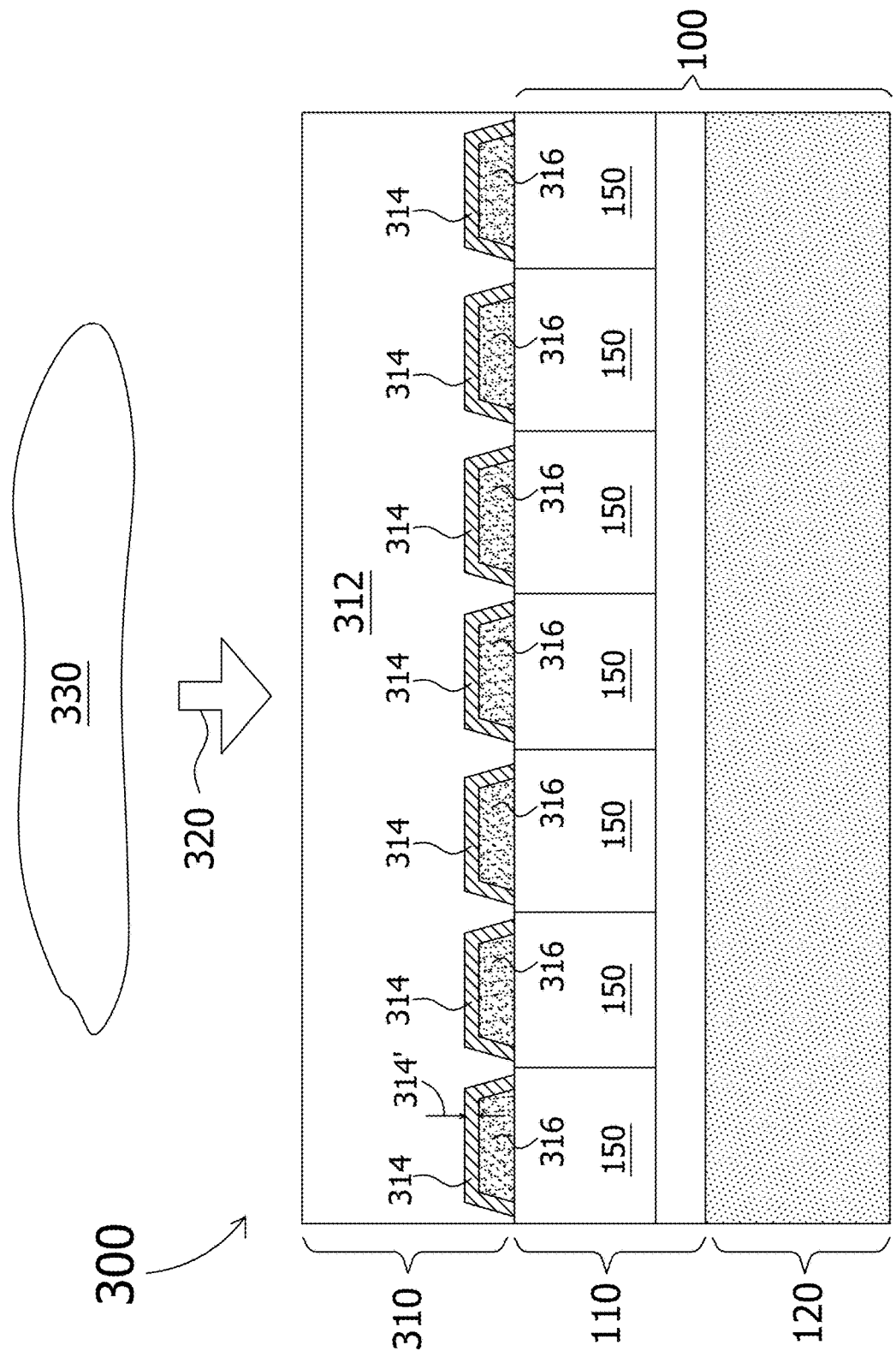
FIG. 3A schematically shows a radiation detector which includes the image sensor of FIG. 2B, according to an embodiment.

FIG. 3A schematically shows a cross-sectional view of a radiation detector 300, according to an embodiment. Specifically, the radiation detector 300 includes a scintillation and reflection layer 310 and the image sensor 100 of FIG. 2B or FIG. 2C. For simplicity, hereafter, only the pixels 150, the radiation absorption layer 110, and the electronics layer 120 of the image sensor 100 are shown, while other components of the image sensor 100 (e.g., the electrical contacts 119A, 119B, the vias 131) are not shown.

In an embodiment, the scintillation and reflection layer 310 includes a substrate 312, reflectors 314, and scintillators 316. The substrate 312 may be not opaque to radiation 320 of interest (e.g., the radiation 320 can penetrate the substrate 312 with partial attenuation or essentially no attenuation). For example, the substrate 312 may comprise silicon.

In an embodiment, each scintillator 316 may be completely enclosed or almost completely enclosed (i.e., essentially completely enclosed) by a pixel 150 and a reflector 314. The scintillators 316 may emit photons when the scintillators 316 are exposed to the radiation 320. The photons may be emitted in multiple directions (e.g., all directions). In an embodiment, the scintillators 316 may comprise a material such as sodium iodide (NaI). In an embodiment, the scintillators 316 may comprise quantum dots. The material of the quantum dots may be cadmium selenide (CdSe), cadmium telluride (CdTe), zinc oxide (ZnO), or any combinations of these substances.

In an embodiment, the material and thickness 314' of each reflector 314 are such that each reflector 314 is not opaque to the radiation 320 but reflects essentially all photons emitted by the scintillator 316 enclosed therein toward it. For example, each reflector 314 may comprise aluminum, silver, gold, copper, and any combinations thereof; and each reflector 314 may have the thickness 314' of around 10 micrometer (μm).

FIG. 3B schematically shows a perspective view of a pixel 150 and its associated reflector 314 and scintillator 316, according to an embodiment. As can be seen in FIG. 3B, the scintillator 316 is completely enclosed by the pixel 150 and the associated reflector 314.

In an embodiment, with reference to FIG. 3A and FIG. 3B, the operation of the radiation detector 300 may be as follows. Specifically, the radiation detector 300 is exposed to the radiation 320 (such as X-ray, Gamma ray, etc.) from an object 330 (e.g., a human body part). The radiation 320 may have previously penetrated or scattered from the object 330 and thus carry information about the object 330.

Because the substrate 312 and the reflectors 314 are not opaque to the radiation 320, each scintillator 316 is exposed to the radiation 320, and emits photons as a result. The photons may be emitted in multiple directions (e.g., all directions).

Each reflector 314 reflects photons incident on it. Because each scintillator 316 is essentially completely enclosed by the associated reflector 314 and the associated pixel 150 as described above, each photon emitted by the scintillator 316 may either enter the pixel 150 with no interaction with the reflector 314 or bounce off the reflector 314 once or more than once before entering the pixel 150. In other words, essentially all (i.e., all or almost all) the photons emitted by the scintillator 316 are prevented by the reflector 314 from not entering the pixel 150. In yet other words, the reflector 314 guides essentially all (i.e., all or almost all) the photons emitted by the scintillator 316 into the pixel 150.

Figure 3C:
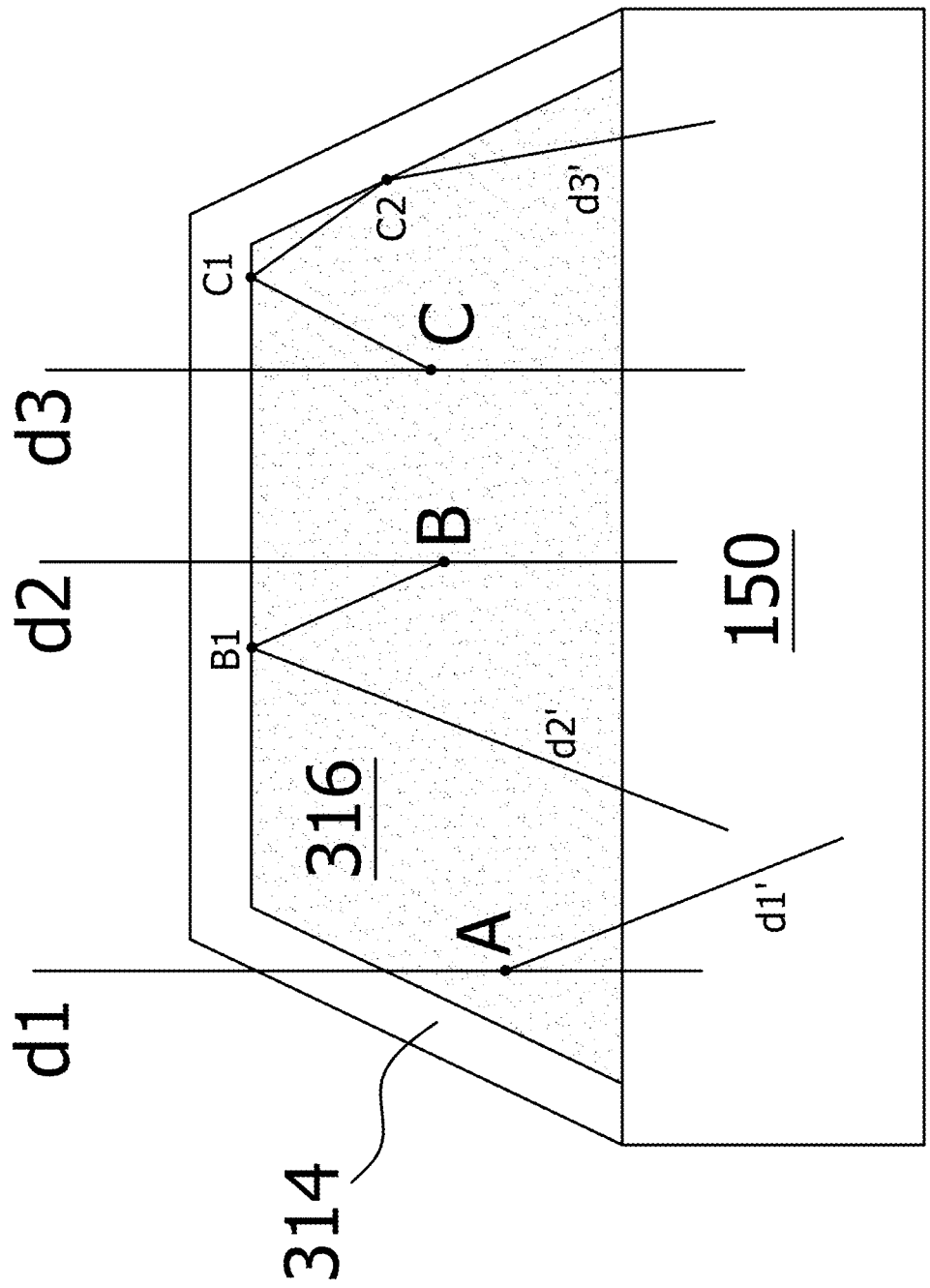
FIG. 3C illustrates how a reflector guides photons emitted by an associated scintillator, according to an embodiment.

FIG. 3C illustrates how a reflector 314 guides photons emitted by the associated scintillator 316 into the associated pixel 150, according to an embodiment. Specifically, in a first example, a first radiation particle may follow the path d1 toward the pixel 150. At point A, the first radiation particle may interact with the scintillator 316 and cause an emission of a first photon that may follow the path d1' into the pixel 150 without any reflection by the reflector 314. In a second example, a second radiation particle may follow the path d2 toward the pixel 150. At point B, the second radiation particle may interact with the scintillator 316 and cause an emission of a second photon that may follow the path B-B1, get reflected by the reflector 314 at point B1, and then follow the path d2' into the pixel 150. In a third example, a third radiation particle may follow the path d3 toward the pixel 150. At point C, the third radiation particle may interact with the scintillator 316 and cause an emission of a third photon that may follow the path C-C1, get reflected by the reflector 314 at point C1, follow the path C1-C2, get reflected by the reflector 314 again at point C2, and then follow the path d3' into the pixel 150. Other paths may be possible.

The operation of the radiation detector 300 can be rephrased as follows. The radiation 320 that may have penetrated or scattered from the object 330 now penetrates the substrate 312 and the reflectors 314 and is converted by the scintillators 316 into photons. Essentially all of the photons are guided into the pixels 150 associated with the scintillators 316 by the reflectors 314. By that way, the image sensor 100 captures an image of the object 330 with negligible crosstalk among the pixels 150 and with less loss of the photons. Pixel crosstalk occurs when photons emitted due to a single particle of the radiation 320 enter more than one pixel 150.

FIG. 4A-FIG. 4H schematically show a fabrication process of the radiation detector 300 of FIG. 3A, according to an embodiment. Specifically, with reference to FIG. 4A, the fabrication process starts with the substrate 312 having a top surface 312s. Next, a stencil 410 having apertures 410a is positioned on the top surface 312s of the substrate 312. In an embodiment, the stencil 410 may be made of a metal. The stencil 410 may alternatively be a pattern formed with a resist.

Figure 4A:
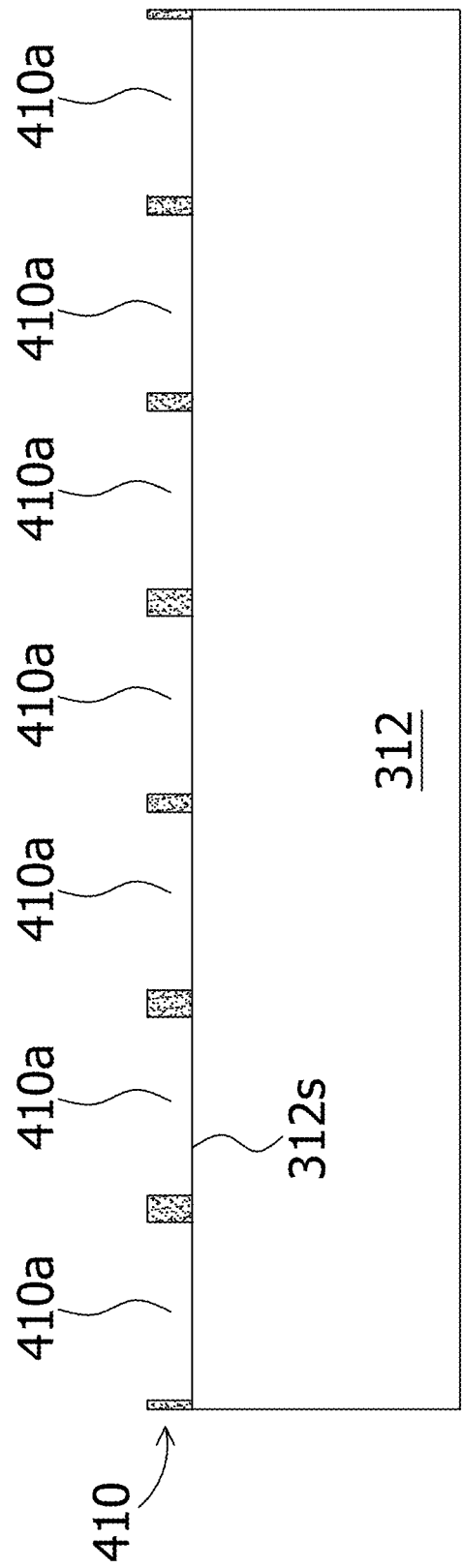
FIG. 4A-FIG. 4H schematically show the formation of the radiation detector of FIG. 3A, according to an embodiment.
Figure 4B:
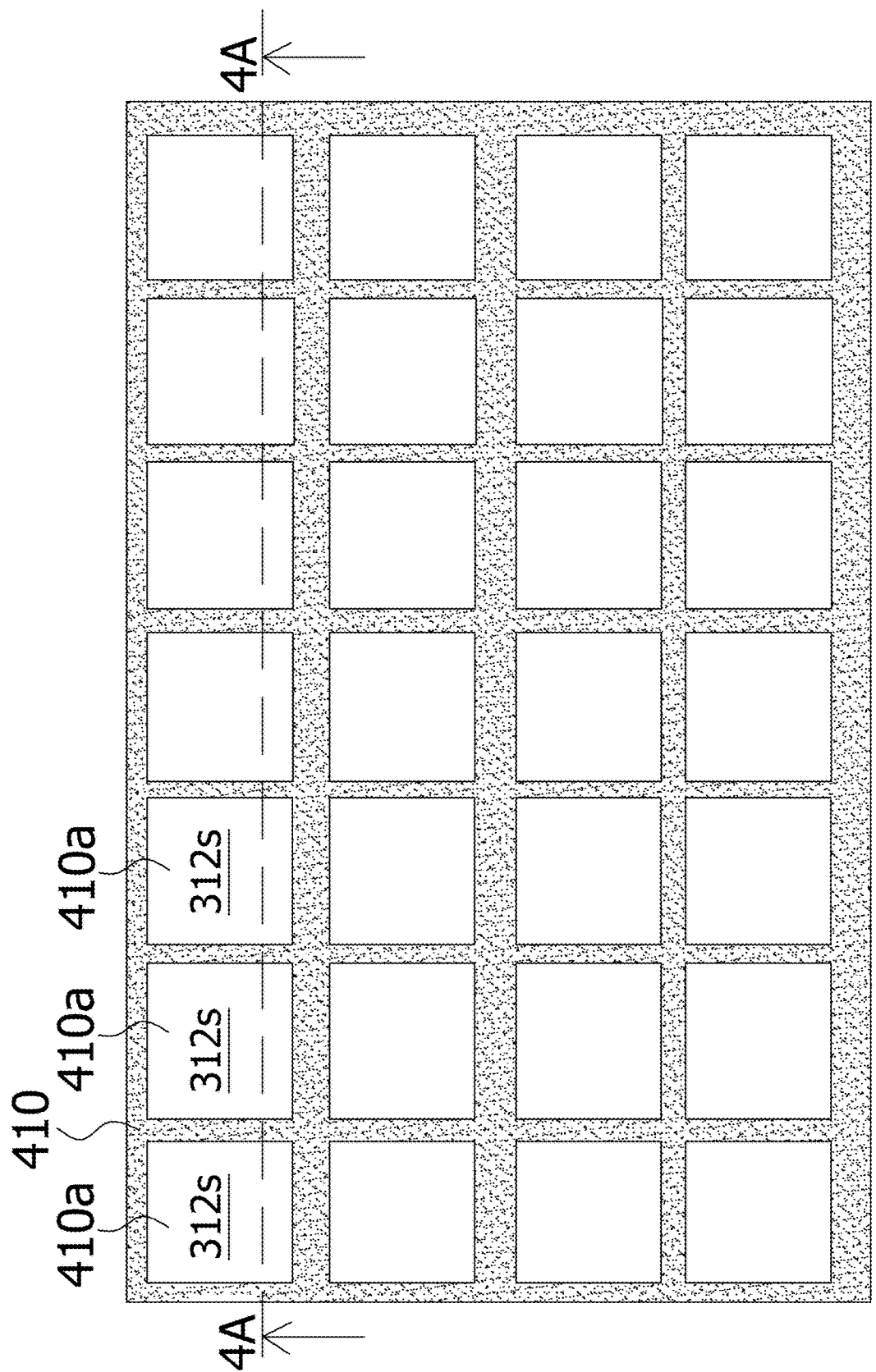

FIG. 4B shows a top view of the structure of FIG. 4A, according to an embodiment, whereas FIG. 4A shows a cross-sectional view of the structure of FIG. 4B along a line 4A-4A. In FIG. 4B, portions of the top surface 312s of the substrate 312 are exposed through the apertures 410a in the stencil 410.

Figure 4C:
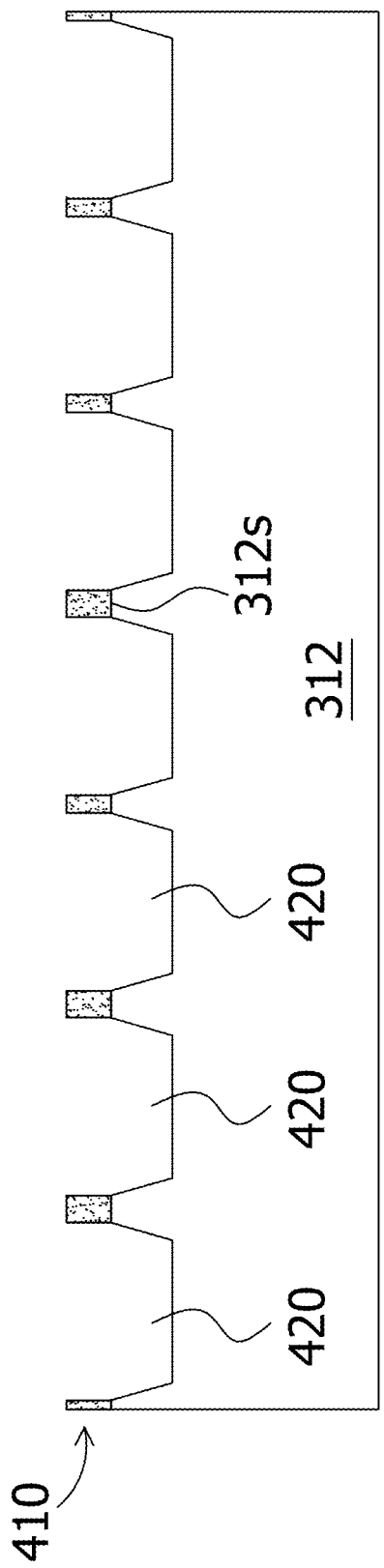

Next, with reference to FIG. 4C, the stencil 410 may be used as a mask for etching the substrate 312, resulting in recesses 420 into the top surface 312s of the substrate 312. In an embodiment, the etching of the substrate 312 may be an anisotropic wet etch using potassium hydroxide (KOH) as an etchant. If the substrate 312 is a silicon substrate and the top surface 312s is a (100) silicon crystallographic plane, then the resulting recesses 420 may have truncated pyramid shapes with flat and angled etched walls as shown in FIG. 4C.

Figure 4D:
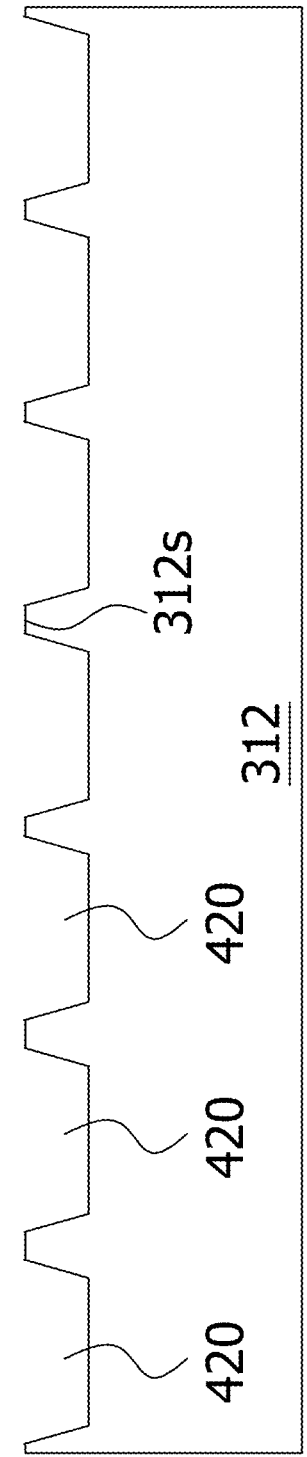
Figure 4E:
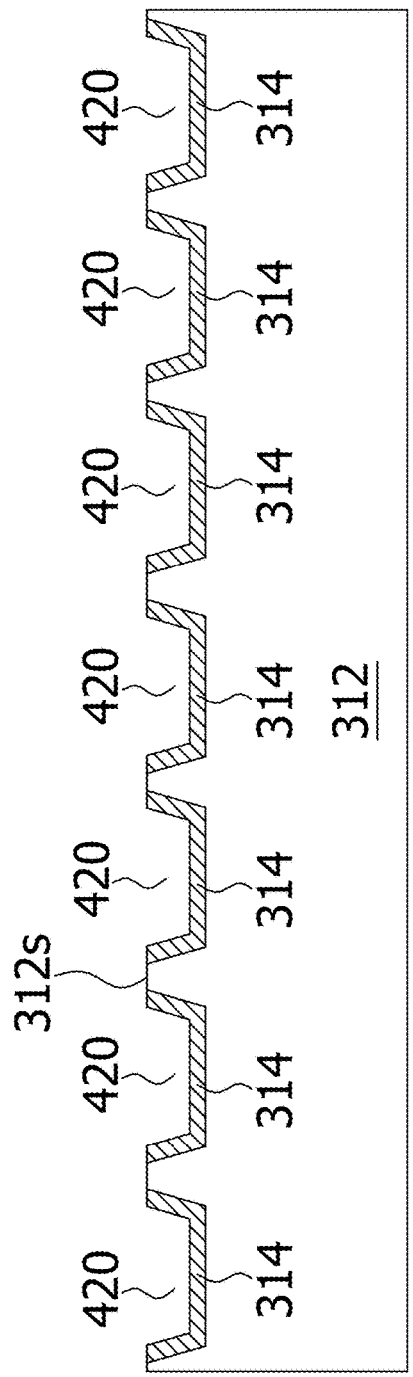

Next, the stencil 410 may be removed resulting in the structure of FIG. 4D. Next, with reference to FIG. 4E, the reflectors 314 (also shown in FIG. 3A) are formed on walls (e.g., sidewalls and bottom walls) of the recesses 420. In an embodiment, the reflectors 314 may be formed by (a) depositing (e.g., by thermal evaporation, sputtering, or other suitable techniques) a layer of aluminum onto the structure of FIG. 4D, and then (b) polishing back until the top surface 312s of the substrate 312 is exposed to the surrounding ambient.

Alternatively, the reflectors 314 may be formed by depositing a layer of aluminum on the structure of FIG. 4C and then removing the stencil 410.

Figure 4F:
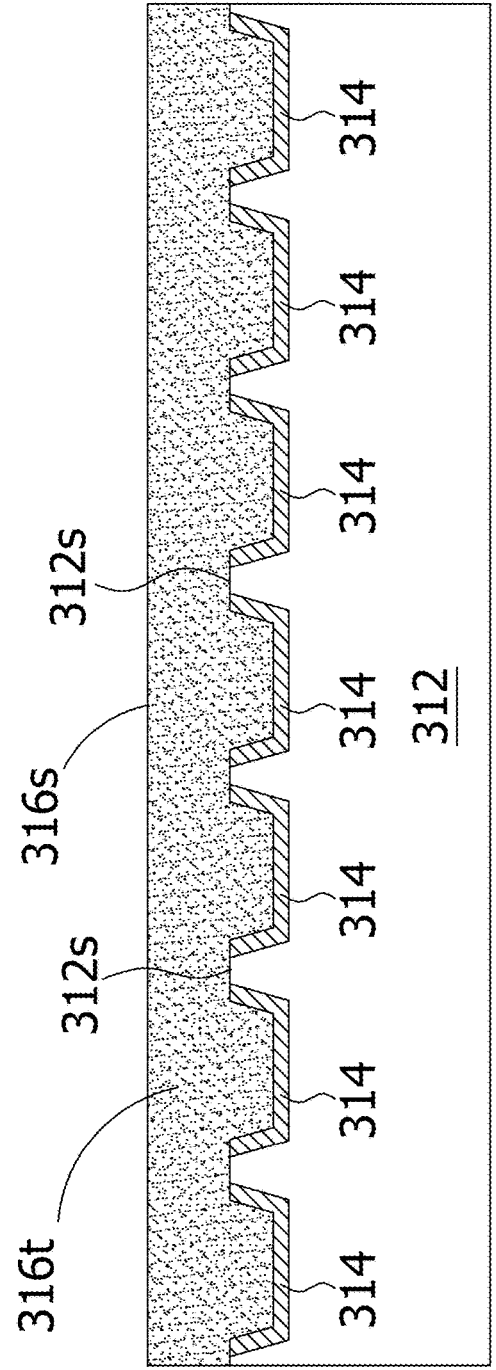

Next, with reference to FIG. 4F, a scintillator layer 316t is formed on top of the reflectors 314 and the top surface 312s. In an embodiment, the scintillator layer 316t may be formed by depositing a composite containing NaI on top of the reflectors 314 and the top surface 312s.

Figure 4G:
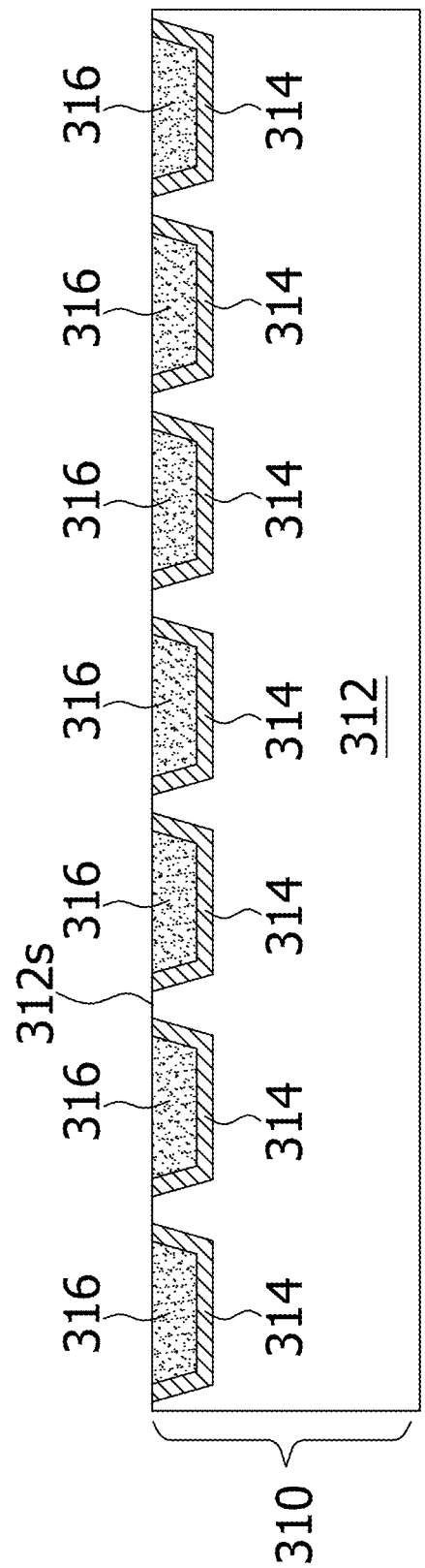

Next, a top surface 316s of the scintillator layer 316t may be polished until the top surface 312s of the substrate 312 is exposed to the surrounding ambient resulting in, as shown in FIG. 4G, the scintillators 316. Also as a result, the scintillation and reflection layer 310 is formed.

Figure 4H:
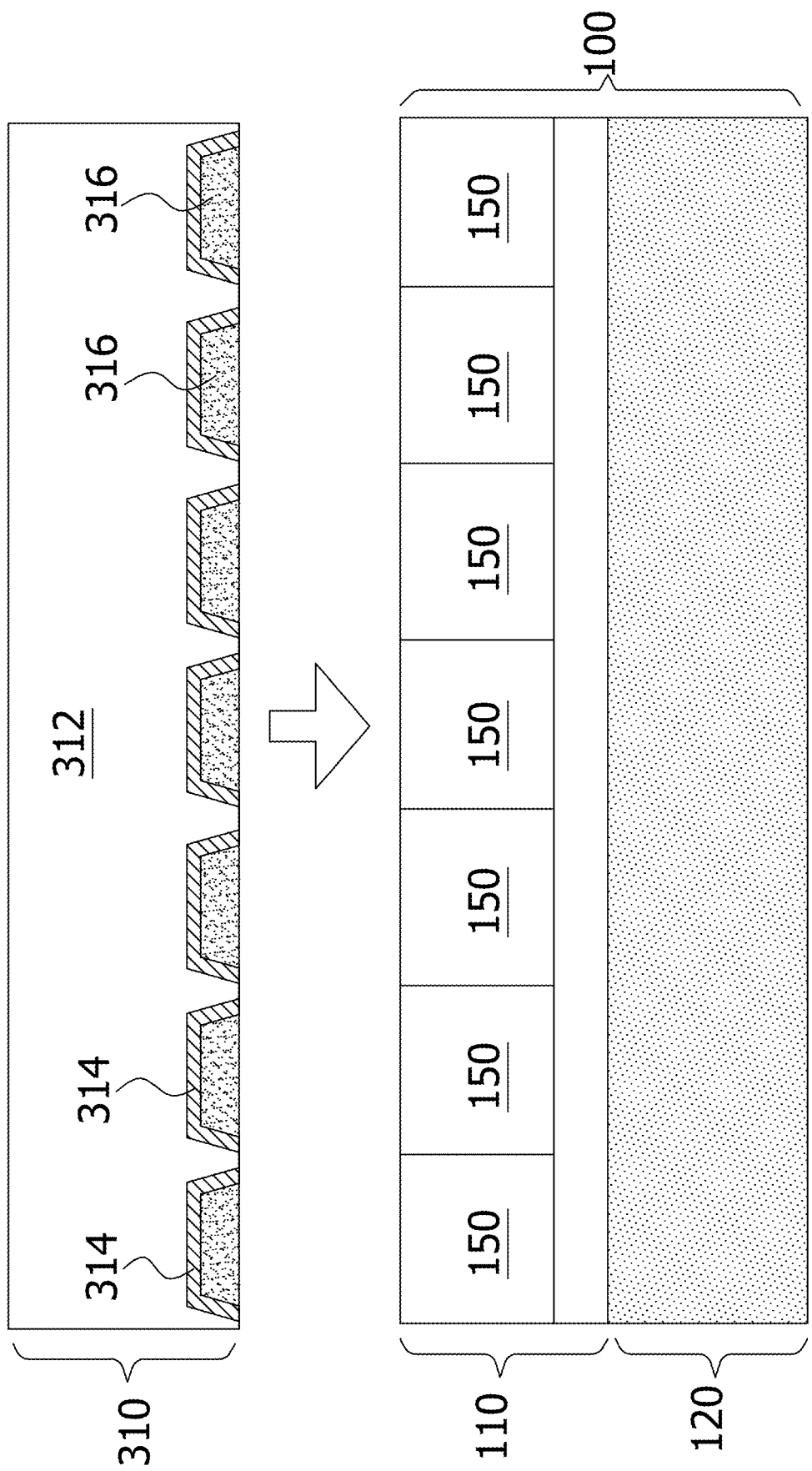

Next, the scintillation and reflection layer 310 is bonded to the image sensor 100, as shown in FIG. 4H, resulting in the radiation detector 300 of FIG. 3A. In an embodiment, the bonding can be direct bonding which is a wafer bonding process without any additional intermediate layers (e.g., solder bumps). The bonding process is based on chemical bonds between two surfaces. Direct bonding may be at elevated temperature but not necessarily so.

In the embodiments described above, with reference to FIG. 3A, the substrate 312 may comprise silicon or other suitable material.

In the embodiments described above, the reflectors 314 comprise aluminum. In an alternative embodiment, the reflectors 314 may comprise another metal such as silver, gold, copper, and any combinations thereof.

In the embodiments described above, with reference to FIG. 3A and FIG. 3B, each pixel 150 has an associated pair of reflector 314 and scintillator 316. In general, each pixel 150 may have N associated pairs of reflectors 314 and scintillators 316 (N is a positive integer) which are within the footprint of the pixel 150. In that general case, for each pixel 150, all or almost all (i.e., essentially all) the photons emitted by the N associated scintillators 316 are guided by the N associated reflectors 314 into that pixel 150.

Figure 5A:
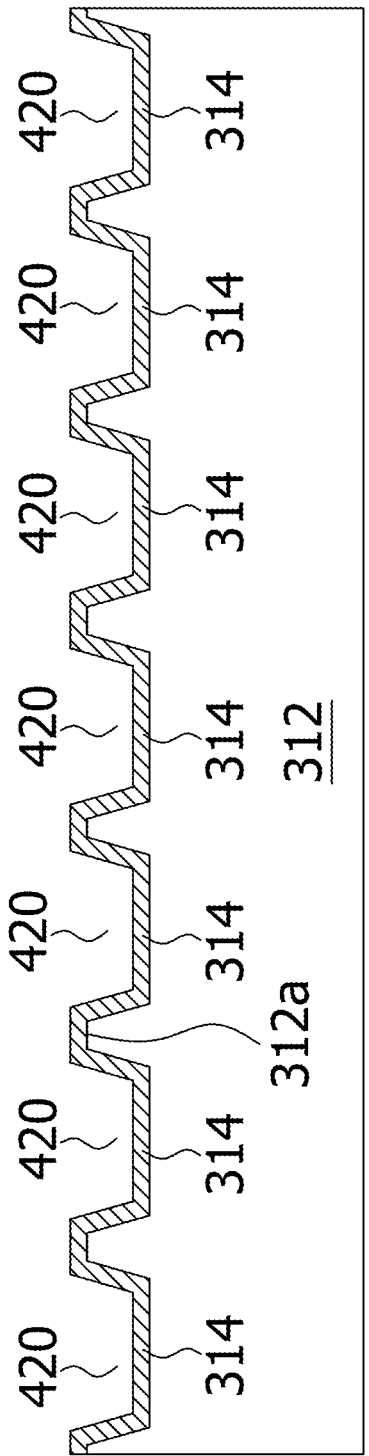
FIG. 5A, FIG. 5B, and FIG. 5C schematically show the formation of an alternative radiation detector, according to an embodiment.

In the embodiments described above, with reference to FIG. 4E, the reflectors 314 are formed by (a) depositing a layer of aluminum on top of the structure of FIG. 4D, and then (b) polishing back until the top surface 312s of the substrate 312 is exposed to the surrounding ambient. In an alternative embodiment, only step (a) mentioned above is performed (i.e., step (b) is not performed) resulting in, as shown in FIG. 5A, the reflectors 314 joined with one another.

Figure 5B:
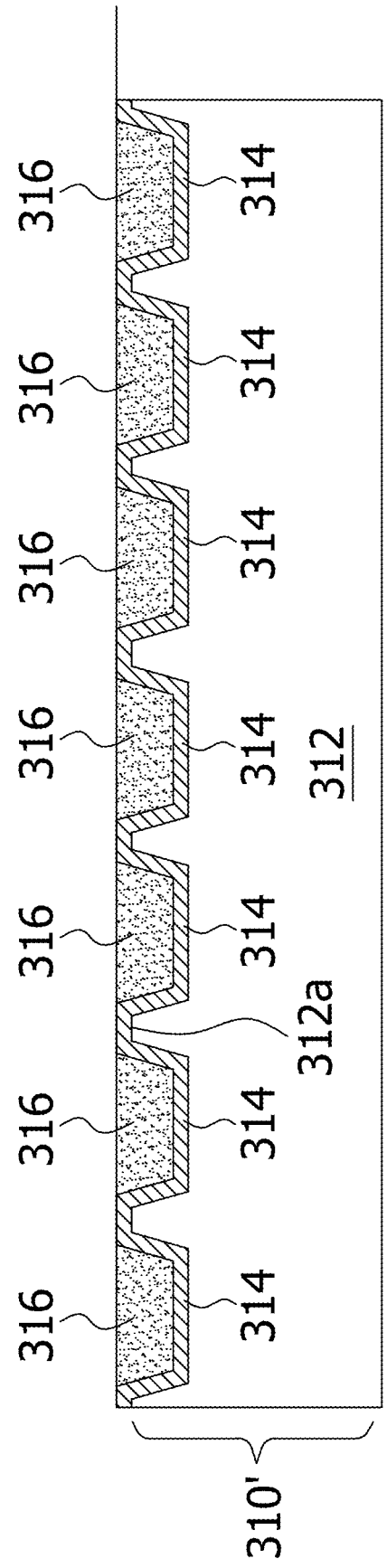

Next, the scintillators 316 are formed in the recesses 420 resulting in a scintillation and reflection layer 310' of FIG. 5B. The formation of the scintillators 316 of FIG. 5B is similar to the formation of the scintillators 316 of FIG. 4G. Finally, the scintillation and reflection layer 310' of FIG. 5B is bonded to the image sensor 100 as shown in FIG. 5C resulting in a radiation detector 500.

Figure 5C:
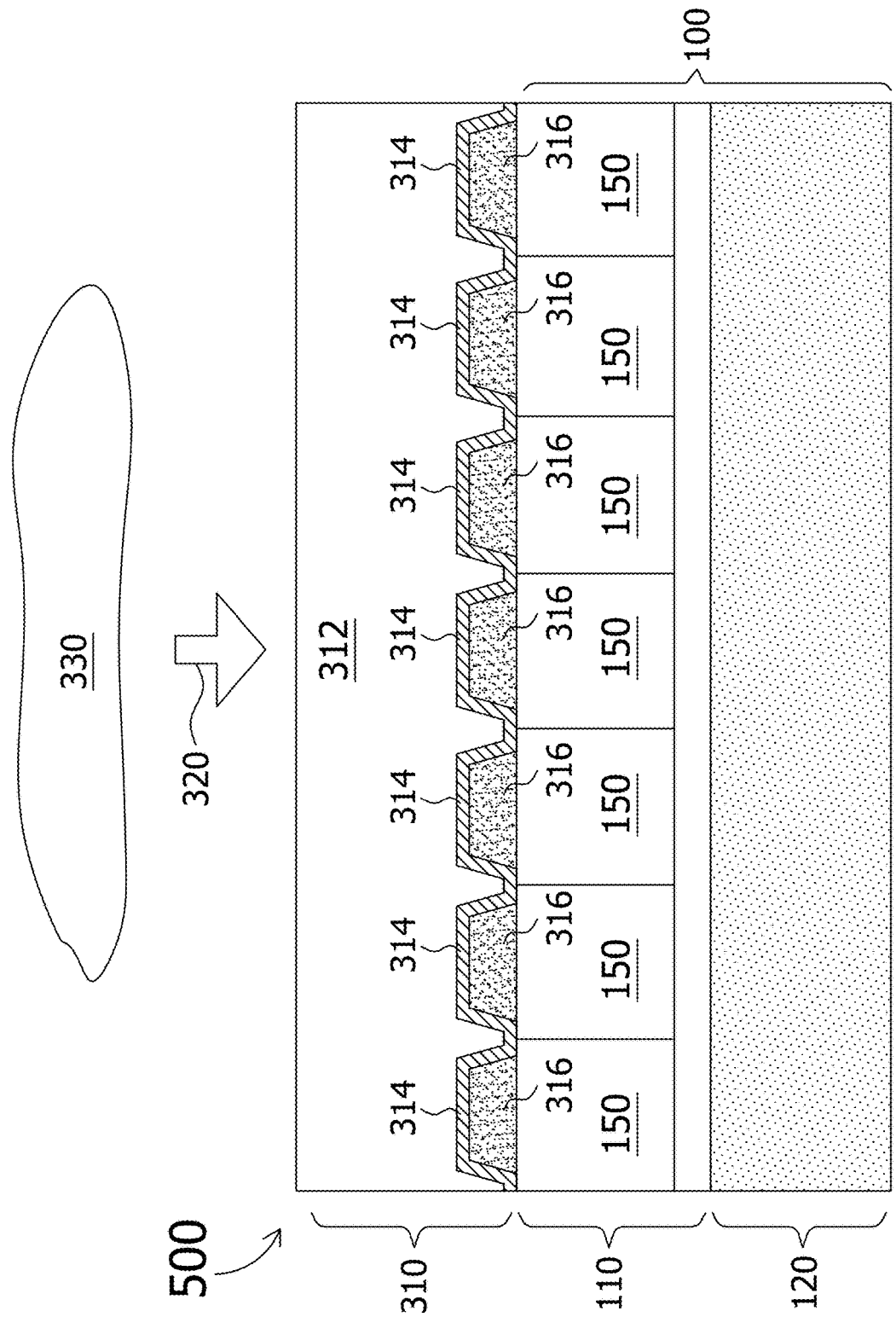

With reference to FIG. 5C, each scintillator 316 is completely enclosed (or almost completely enclosed) by the associated pixel 150 and the reflectors 314.

Like the radiation detector 300 of FIG. 3A, the radiation detector 500 of FIG. 5C is also sensitive to the incident radiation 320. During the operation of the radiation detector 500, all or almost all the photons emitted by the scintillators 316 are guided by the reflectors 314 into the pixels 150.

In the embodiments described above, with reference to FIG. 3A & FIG. 5C, in the radiation detectors 300 and 500, the scintillation and reflection layer 310/310' may be in direct physical contact with the pixels 150 of the image sensor 100. In an alternative embodiment, there may be a seal layer (not shown) sandwiched between and in direct physical contact with the scintillation and reflection layer 310/310' and the image sensor 100. In this alternative embodiment, the seal layer may comprise a material which is transparent or not opaque to the radiation 320 such as a polymer or silicon dioxide. The seal layer helps bond the scintillation and reflection layer 310/310' to the image sensor 100. However, with the presence of the seal layer, each scintillator 316 is no longer completely enclosed (or almost completely enclosed) by the associated pixel 150 and the associated reflector 314. In an embodiment, the seal layer should be thin because the thicker the seal layer is, the more photons emitted by a scintillator 316 may evade the associated pixel 150 thereby increasing pixel crosstalk.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A radiation detector, comprising:
a first pixel;
a first reflector;
a first scintillator;
a first substrate;
a second pixel adjacent to the first pixel;
a second reflector; and
a second scintillator;
wherein the first scintillator is in direct physical contact with the first pixel;
wherein the first reflector is configured to guide essentially all photons emitted by the first scintillator into the first pixel;
wherein the second reflector is configured to guide essentially all photons emitted by the second scintillator into the second pixel;
wherein the first reflector is in direct physical contact with the second reflector;
wherein the first scintillator is in a recess into a surface of the first substrate.

2. The radiation detector of claim 1, wherein the first reflector is in direct physical contact with the first scintillator.

3. The radiation detector of claim 1, wherein the first reflector is configured to reflect photons emitted by the first scintillator toward the first reflector.

4. The radiation detector of claim 1, wherein the first reflector is not opaque to radiation particles which are able to cause the first scintillator to emit photons when the radiation particles are incident on the first scintillator.

5. The radiation detector of claim 1, wherein the first scintillator is essentially completely enclosed by the first reflector and the first pixel.

6. The radiation detector of claim 1, further comprising:
a fourth reflector; and
a fourth scintillator,
wherein the fourth reflector is configured to guide essentially all photons emitted by the fourth scintillator into the first pixel.

7. The radiation detector of claim 1, wherein the first scintillator comprises sodium iodide.

8. The radiation detector of claim 1, wherein the first scintillator comprises quantum dots.

9. The radiation detector of claim 1, wherein a portion of the first reflector is disposed on sidewalls of the recess.

10. The radiation detector of claim 1, wherein a portion of the first reflector is disposed on an end wall of the recess.

11. The radiation detector of claim 1, wherein the recess has a shape of a truncated pyramid.

12. The radiation detector of claim 1, wherein the first substrate comprises silicon or silicon dioxide.

13. The radiation detector of claim 1, further comprising a second substrate, wherein the first pixel is in the second substrate.

14. A method, comprising:
forming a first recess into a surface of a first substrate;
forming a first reflector on walls of the first recess;
forming a first scintillator in the first recess;
forming a second recess into the surface of the first substrate;
forming a second reflector on walls of the second recess; and
forming a second scintillator in the second recess,
bonding a second substrate having a first pixel and a second pixel to the first substrate, wherein the first reflector is configured to guide essentially all photons emitted by the first scintillator into the first pixel;

wherein the second reflector is configured to guide essentially all photons emitted by the second scintillator into the second pixel;

wherein the first scintillator is in direct physical contact with the pixel;

wherein the first reflector is in direct physical contact with the second reflector.

15. The method of claim 14, wherein the first reflector is in direct physical contact with the first scintillator.

16. The method of claim 14, wherein the first reflector is configured to reflect photons emitted by the first scintillator toward the first reflector.

17. The method of claim 14, wherein the first scintillator is essentially completely enclosed by the first reflector and the pixel.

* * * * *